United States Patent
Schroth et al.

(10) Patent No.: US 9,465,660 B2
(45) Date of Patent: Oct. 11, 2016

(54) PERFORMING A TASK IN A SYSTEM HAVING DIFFERENT TYPES OF HARDWARE RESOURCES

(75) Inventors: Albrecht Schroth, Herrenberg (DE); Subramaniam Venkata Kalambur, Karnataka (IN); Michael Steffens, Boeblingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 313 days.

(21) Appl. No.: 14/004,429

(22) PCT Filed: Apr. 11, 2011

(86) PCT No.: PCT/US2011/031894
§ 371 (c)(1),
(2), (4) Date: Sep. 11, 2013

(87) PCT Pub. No.: WO2012/141677
PCT Pub. Date: Oct. 18, 2012

(65) Prior Publication Data
US 2014/0007128 A1    Jan. 2, 2014

(51) Int. Cl.
*G06F 9/50* (2006.01)
*G06T 1/20* (2006.01)

(52) U.S. Cl.
CPC .............. *G06F 9/50* (2013.01); *G06F 9/5044* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 5,708,828 A | * | 1/1998 | Coleman | G06F 17/30569 707/E17.006 |
| 5,995,988 A | * | 11/1999 | Freidin | H03K 19/1736 708/232 |
| 7,071,854 B1 | * | 7/2006 | Cardosa et al. | 341/67 |
| 7,975,151 B2 | * | 7/2011 | Coenen | 713/193 |
| 8,276,164 B2 | * | 9/2012 | Munshi | G06F 9/4843 718/102 |
| 2005/0015430 A1 | | 1/2005 | Rothman et al. | |
| 2007/0033592 A1 | | 2/2007 | Roediger et al. | |
| 2007/0283175 A1 | * | 12/2007 | Marinkovic et al. | 713/320 |
| 2008/0276262 A1 | | 11/2008 | Munshi et al. | |
| 2009/0109230 A1 | * | 4/2009 | Miller et al. | 345/506 |
| 2009/0158248 A1 | | 6/2009 | Linderman et al. | |
| 2010/0257538 A1 | | 10/2010 | Zhao et al. | |
| 2011/0063304 A1 | | 3/2011 | Diard et al. | |

OTHER PUBLICATIONS

A New Platform Layer in Sql Server 2005 to Exploit New Hardware Capabilities and Their Trends (Research Paper) Publication Date: Jul. 20, 2005; Author(s): Slava Oks.
Efficient Event Processing Through Reconfigurable Hardware for Algorithmic Trading (Research Paper) Publication Date 2010; vol. 3; On pp. 1525-1528; Author(s): Mohammad Sadoghi; Martin Labrecque; Marsh Singh; Warren Shun; Hans-Arno Jacobsen.
Embracing Heterogeneity-Parallel Programming for Changing Hardware (Research Paper) Author(s): Michael D. Linderman; James Balfour; Teresa H. Meng; William J. Dally.
International Searching Authority, The International Search Report and the Written Opinion, Nov. 29, 2011, 10 Pages.
Wikipedia, CUDA (an acronym for Compute Unified Device Architecture), Feb. 8, 2010 (7 pages).
Wikipedia, OpenCL (Open Computing Language), Apr. 2, 2011 (7 pages).

* cited by examiner

*Primary Examiner* — Meng An
*Assistant Examiner* — Michael Ayers
(74) *Attorney, Agent, or Firm* — Trop, Pruner & Hu, P.C.

(57) ABSTRACT

Different types of hardware processing resources in a system are identified (102). In response to a request to perform a task, a respective one of the different types of hardware processing resources is selected (104) to perform the task.

14 Claims, 3 Drawing Sheets

PERFORMING A TASK IN A SYSTEM HAVING DIFFERENT TYPES OF HARDWARE RESOURCES

CROSS-REFERENCE TO RELATED APPLICATION

This application is a national stage application under 35 U.S.C. §371 of PCT/US2011/031894, filed Apr. 11, 2011.

BACKGROUND

A system can have different types of hardware processing resources, including a general central processing unit (CPU) and specialized hardware processing resources such as a digital signal processor (DSP) graphics processing unit (GPU), and so forth.

BRIEF DESCRIPTION OF THE DRAWINGS

Some embodiments are described with respect to the following figures.

DETAILED DESCRIPTION

Figure 1:
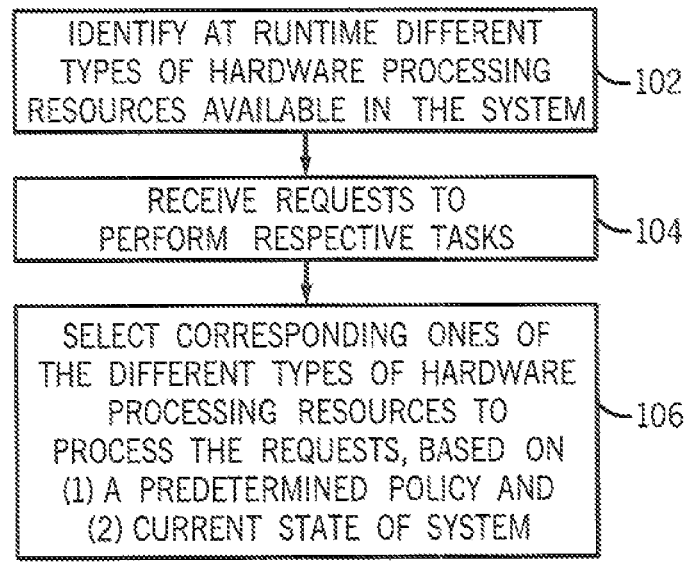
FIG. 1 is a flow diagram of a process of enhancing utilization of hardware processing resources in accordance with some implementations.

A system (e.g., a computer, a personal digital assistant, a storage server, a network server, or other type of system) can include one or multiple application programs that are able to issue requests to perform respective tasks in the system. Examples of tasks that can be performed include data encryption or decryption, data compression or decompression, data encoding or decoding, hash value calculation, or other tasks.

Often, code associated with an application in a system can be designed for a particular type of hardware processing resource, such as a general central processing unit (CPU) of the system. A "hardware processing resource" refers to a hardware component of a system that can be requested, instructed, or commanded to perform a target task (or tasks). A "general CPU" refers to a microprocessor, set of microprocessors, or a set of one or multiple cores within a multi-core microprocessor, that is designed to execute code associated with various applications and other layers (such as the operating system) of the system. Thus, to perform a task requested by the application, the corresponding code is executed on the general CPU.

In some cases, it may be beneficial to perform a given application task on a different type of hardware processing resource than the general CPU. For example, the given task may run faster on a graphics processing unit (GPU) than the general CPU, since the CPU can have features that are more optimized for efficient performance of the task.

As another example, when a given task is requested by the application, a first type of processing resource may be heavily loaded, while a different type of hardware processing resource is lightly used or idle. However, since the code for the requesting application is designed for just the first type of processing resource, the system would not be able to perform the given task using another type of hardware processing resource. As a result, less efficient utilization of the available hardware processing resources of the system is realized.

Additionally, the presence of multiple types of hardware processing resources in a system provides an opportunity to perform various tasks in parallel. However, if appropriate mechanisms are not provided to take advantage of the availability of the multiple types of hardware processing resources, then parallel execution of certain tasks on respective ones of the multiple types of hardware processing resources may not be possible.

Moreover, the specific types of hardware processing resources that are available can vary from system to system. The specific arrangement of hardware processing resources may be driven by a customer, who may customize the system according to the specific desires of the customer. For example, one customer may choose to include a GPU from a first vendor first system purchased by the first customer, while a second customer may choose a GPU from a second, different vendor for a second system purchased by the second customer. Additionally, for cost reasons, one customer may elect to include fewer hardware processing resources in a system than another customer. In addition, even after purchase of a system, a customer may decide to perform an upgrade in which an existing hardware processing resource is replaced with a different type of hardware processing resource. Thus, specific arrangements of hardware processing resources may vary from system to system, and for a given system, may even vary over time. Therefore, it can be difficult to know ahead of time what specific hardware processing resources are available within any given system. As a result, a proper set of code may not be loaded in the given system to efficiently utilize all available hardware processing resources of the given system.

In accordance with some implementations, mechanisms are provided to enable a system to identify, at runtime, the specific types of hardware processing resources that are available in a particular system. The term "runtime" refers to a time during operation of the particular system, such as operation during use by a user, operation during testing or configuration of the particular system, and so forth. Mechanisms according to some implementations allows tasks to be run in parallel over multiple available types of hardware processing resources, which enhances system performance. Moreover, mechanisms according to some implementations are able to assign certain tasks to a selected one of multiple types of hardware processing resources that is able to perform such tasks better (e.g., faster, more efficiently, etc.) than other type(s) of hardware processing resources. In addition, mechanisms according to some implementations are able to use a second "best" type of hardware processing resource if the "best" type of hardware processing resource is not available to perform a particular task.

More generally, utilization of available types of hardware processing resources is optimized (or enhanced) to maximize (or enhance) system performance or throughput.

As depicted in FIG. 1, during operation of a system, a dispatcher in the system identifies (at 102), at runtime, different types of hardware processing resources available in the system. The identification of the different types of hardware processing resources available in the system can be performed during a boot procedure of the system, or alternatively, after booting has completed in the system.

The dispatcher further receives (at 104) requests to perform corresponding tasks. The requests may be received on one application in the system, or alternatively, the requests may be received from multiple applications in the system. As yet a further alternative, at least one of the requests can be received from a source external to the system, such as a request received over a network from a remote system.

In response to the received requests, the dispatcher selects (at 106) corresponding ones of the different types of hardware processing resources in the system to process the requests. The selection of the different types of hardware processing resources can be based on at least two factors: (1) a predetermined policy, and (2) current state of the system.

The current state of the system refers to usage and availability of the different types of hardware processing resources. For example, some of the hardware processing resources may be more heavily loaded than other hardware processing resources, which can impact which types of hardware processing resources are selected to perform certain tasks. Some hardware processing resources can be shared by multiple tasks, while other hardware processing tasks may be so loaded that they no longer are available. The current state of the system can also change as new requests are received, since heavier loading is placed on the hardware processing resources as such new requests are received and executed.

The predetermined policy can be provided in machine-readable instructions programmed or built into a controller (e.g., a processor, a microcontroller, a computer, a programmable gate array, an application-specific integrated circuit device, etc.) used to implement the dispatcher. Such a policy is referred to as a built-in policy, since it is implemented with instructions programmed or built into the controller that implements the dispatcher. Alternatively, the predetermined policy can be described in an object (e.g., file, code, etc.) that is external to the dispatcher. This latter policy is referred to as an external policy.

Generally, the predetermined policy specifies a goal to be achieved in utilization of the hardware processing resources in the system. For example, the predetermined policy can specify that a given task is to be performed by a specific type of hardware processing resource that achieves optimized performance. For example, the predetermined policy can specify that an encryption task is to be performed by a DSP rather than the general CPU. As another example, the predetermined policy can specify that a specific decoding task is to be performed by a GPU rather than the general CPU.

The predetermined policy an also specify conditions under which different ones of the available different types of hardware processing resources are to be utilized. For example, the predetermined policy can specify that a given task is to be performed by a GPU when the GPU is available. However, if the GPU is busy, then the predetermined policy can specify that the next best type of hardware processing resource to use for performing the given task is a DSP.

The predetermined policy can also specify load balancing across available different types of hardware processing resources in the system. Thus, rather than execute certain tasks on a specific subset of hardware processing resources, the tasks can be distributed across a larger number of different types of hardware processing resources to enhance utilization of the available hardware processing resources in the system, and to allow for parallel processing of the tasks.

In some implementations, the different types of hardware processing resources that may be available in a system include: general CPU, GPU, digital signal processor (DSP), FPGA (field programmable gate array), a CPU having a specific instruction set, encryption/decryption hardware, compression/decompression hardware, and so forth. The GPU, DSP, FPGA, CPU having a specific instruction set, encryption/decryption hardware, and compression/decompression hardware are examples of specialized hardware processing resources.

A GPU is a specialized microprocessor that is able to perform certain graphics tasks, such as graphics rendering, on an accelerated basis. A DSP is a specialized microprocessor with an optimized architecture for performing certain types of digital signal processing, including filtering, compression/decompression, and other calculations.

An FPGA is a gate array that is programmable in the field (after manufacture of the FPGA), such as during use (runtime) of the FPGA. The FPGA is field programmable to perform a variety of different tasks. At runtime, the FPGA may also be reprogrammable modify its operation.

A CPU having a specific instruction set refers to a CPU that is loadable with a particular instruction set selected from different types of instruction sets.

Encryption/decryption hardware refers to hardware specially designed to perform a particular encryption(s) and decryption(s) of data. Compression/decompression hardware refers to hardware specially designed to perform particular compression(s) and decompression(s).

Figure 2:
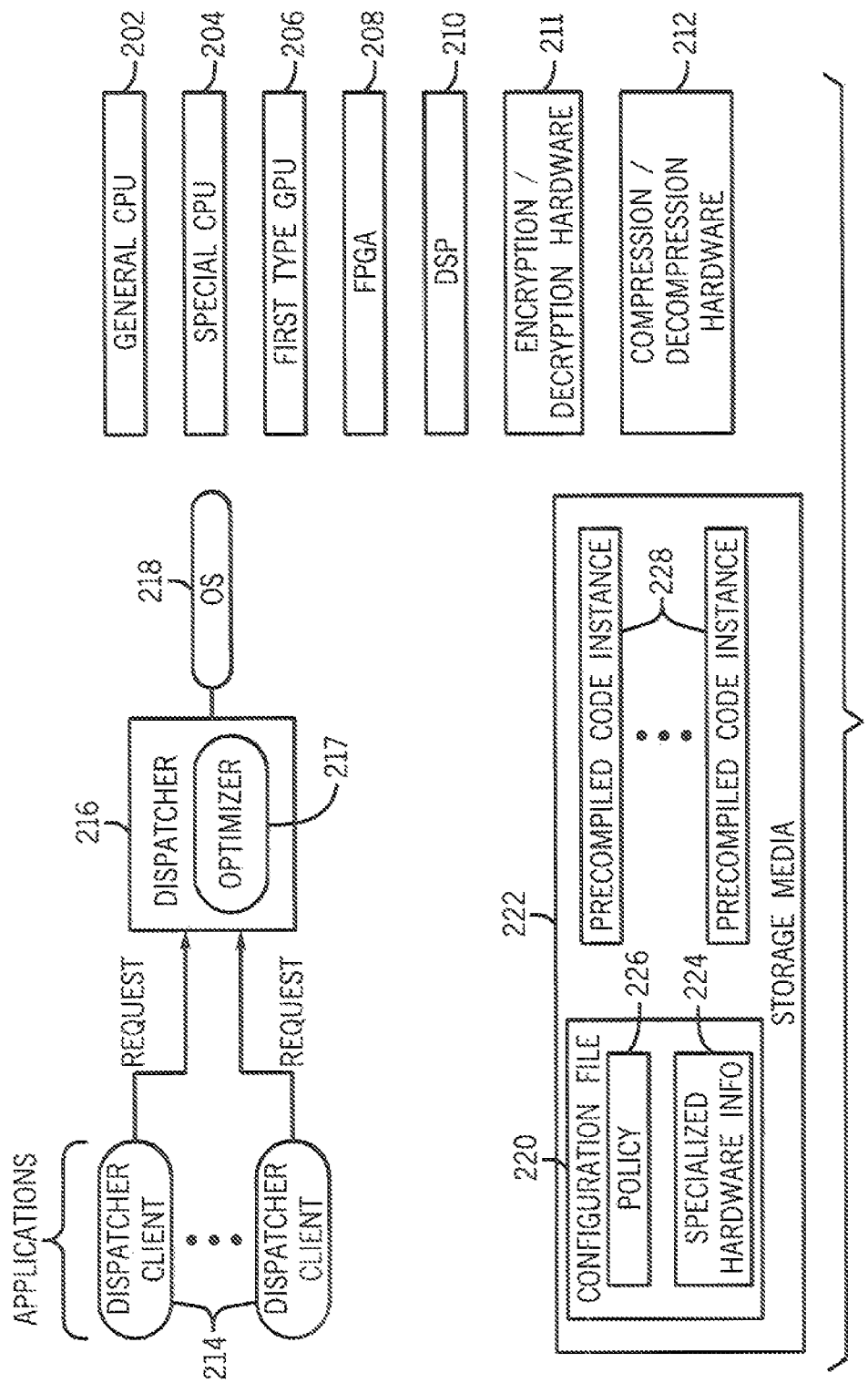
FIG. 2 is a block diagram of an example arrangement that incorporates some implementations.

FIG. 2 is a block diagram of an example system that includes various different types of hardware processing resources. In the example of FIG. 2, the different types of hardware processing resources include a general CPU 202, a special CPU 204 (which is a CPU having a specific instruction set, for example), a first type GPU 206 (e.g., a GPU from a first vendor), an FPGA 208, a DSP 210, encryption/decryption hardware 211, and compression/decompression hardware 212. In a different system, a different arrangement of hardware processing resources can be provided. For example, instead of the first type of GPU 206, a different system can have a second type of GPU (a GPU from a second vendor that is different from the first vendor). Alternatively, the second system may be without the encryption/decryption hardware 211 and/or compression/decompression hardware 212. More generally, different systems can have different sets of the hardware processing resources. In addition, a given system's hardware processing resources can also change over time, such as due to repair or upgrades.

The system of FIG. 2 also includes various applications, which are represented in FIG. 2 as dispatcher clients 214. The dispatcher clients 214 are able to submit requests to a dispatcher 216 according to some implementations. In some examples, the dispatcher 216 is implemented with instructions that run in a user space of the system. In other examples, the dispatcher 216 can be part of other layers of the system, including an operating system (OS) 218. The dispatcher 216 of FIG. 2 is able to perform tasks according to FIG. 1, for example. As shown in FIG. 2, the dispatcher 216 includes an optimizer 217 that is able to optimize selection of hardware processing resources to process requests, based on a predetermined policy and on a current state of the system, as discussed above.

During operation of the system of FIG. 2, in response to a request from a dispatcher client 214, the dispatcher 216 queries the operating system 218 and accesses a configuration file 220 (stored in storage media 222) to identify the specific different types of hardware processing that are available in the system. The operating system 218 is aware of most or all of the hardware processing resources that are present in the system. For specific types of specialized hardware processing resources that may not be made visible to the operating system 218, such as the FPGA 208 or the encryption/decryption or compression/decompression hardware 211 or 212, identification of availability of the FPGA 208 or hardware 211 or 212 is determined by accessing the configuration file 220, which can be provided with information 224 regarding availability of specialized hardware not visible to the operating system 218.

Based on querying the operating system 218 and possibly accessing the configuration file 220, the dispatcher 216 is able to determine which types of hardware processing resources are available in the system.

Although just one dispatcher 216 is shown in FIG. 2, it is noted that there can be multiple dispatchers 216, with one dispatcher associated with a respective one or subset of the dispatcher clients 214. Each dispatcher client 214, according to these examples, would submit a request to its corresponding dispatcher.

In some implementations, the configuration file 220 can also include a preconfigured policy 226 that specifies a goal to be achieved in utilization of the available hardware processing resources in the system. Even though the preconfigured policy 226 is depicted as being part of the configuration file 220, the policy 226 can be a separate data structure in the storage media 222. In alternative implementations, instead of providing the policy 226 in the configuration file 220, the policy 228 can be built-in or programmed in the dispatcher 216.

The policy 226 can specify that optimized performance is to be provided for a given task, such that the type of hardware processing resource selected by the dispatcher 216 for the given task would be the one that is most optimized to perform the given task. For example, the policy 226 can specify that an encryption/decryption task is to be performed by the encryption/decryption hardware 211 rather than by the general CPU 202 (for enhanced performance). As another example, the policy 226 can specify that hash calculation is to be performed by the GPU 206 rather than the general CPU 202 (for enhanced performance). More generally, the policy 226 indicates which types of hardware processing resources are preferred for respective ones of the tasks.

In alternative examples, the policy 226 can also specify an order in which the different types of hardware processing resources are to be selected for performing a given task. If the most preferred type of hardware processing resource is busy or otherwise unavailable, then the policy 226 can cause the dispatcher 216 to select the next "best" type of hardware processing resource. The policy 226, in further examples, can also specify that load balancing should be applied. Thus, for example, rather than directing all tasks from a particular application to a specific type of hardware processing resource, the dispatcher 216 can distribute the tasks across the different types of hardware processing resources to help balance the load, and to enhance parallel processing of the tasks. For example, if the particular application requests performance of a number of encryption tasks, these encryption tasks can be distributed across multiple hardware processing resources (e.g., GPU 206, DSP 210, encryption/decryption hardware 211), even though the policy 226 may specify that the encryption/decryption hardware 211 is the preferred hardware processing resource for performing encryption tasks.

The dispatcher 216 is able to handle multiple requests. The dispatcher 216 can either dispatch a second request (received after a first request) to the same type of hardware processing resource (as the first request), or alternatively, the dispatcher 216 can distribute the multiple requests across different hardware processing resources for load balancing and for enhanced parallel processing.

Figure 4:
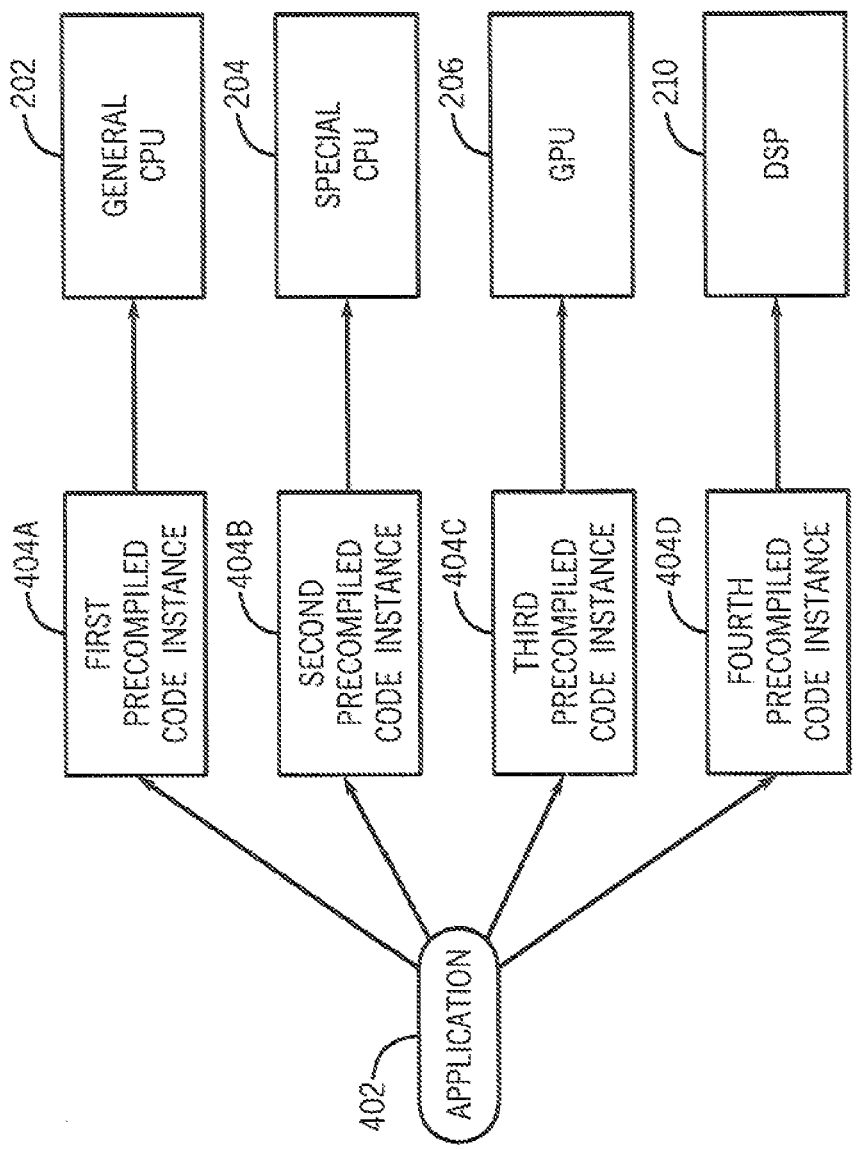
FIG. 4 is a block diagram of precompiled code instances associated with a given application, in accordance with some examples.

The storage media 222 also stores precompiled code instances 228. A precompiled code instance refers to code of an application that is already compiled (compiled in advance), such as into an executable binary or object code. In some implementations, for each given application, there can be multiple precompiled code instances 228 for respective ones of different types of hardware processing resources. If the tasks of a given application can be performed on the general CPU 202, the special CPU 204, the CPU 206, and the DSP 210, for example, then there would be four respective precompiled code instances 228 for the given application, where each of the precompiled code instances 228 is designed (or optimized) for execution on the respective type of hardware processing resource. For example, as shown in FIG. 4, a first precompiled code instance 404A for a given application 402 is optimized for the general CPU 202, a second precompiled code instance 404B for the given application 402 is optimized for the special CPU 204, a third precompiled code instance 404C for the given application 402 is optimized for the CPU 206, and a fourth precomputed code instance 404D for the given application 402 is optimized for the DSP 210. Depending on which of the different types of hardware processing resources is selected by the dispatcher 216 (according to the preconfigured policy 226 and current state of the system) for executing a particular task, a respective one of the precompiled code instances 228 is selected for loading on the selected type of hardware processing resource.

It is noted that certain hardware processing resources are "pure" hardware processing resources in that code is not loaded on these hardware processing resources to perform a given task. As examples, the encryption/decryption hardware 211 and compression/decompression hardware 212 are able to perform respective tasks without loading code onto such hardware, since such hardware are already preconfigured to perform respective tasks. In some implementations, even for such hardware, including the encryption/decryption hardware 211 and compression/decompression hardware 212, precompiled code instances 228 are still provided. For such hardware, instead of loading the precompiled code instances for execution on the hardware, the precompiled code instances are loaded into the system to interface to the respective hardware. For example, the precompiled code instance that is loaded can act as a translator to translate between a data format of the hardware and a data format used by the system. The precompiled code instance can also execute to transfer control to the hardware, or to provide status information of the hardware to the dispatcher 216.

The FPGA 208 can also be associated with a respective precompiled code instance. The FPGA 208 also does not "execute" its precompiled code instance. Rather, the precompiled code instance associated with the FPGA 208 is executed to cause field programming of the FPGA 208 to perform a desired task. For example, for two applications in the system, there can be corresponding multiple precompiled code instances for the respective applications that are associated with the FPGA 208. The first of the two precompiled code instances will program the FPGA 208 in a first way, while a second of the precompiled code instances for the FPGA 208 will program the FPGA 208 in a second, different way.

Figure 3:
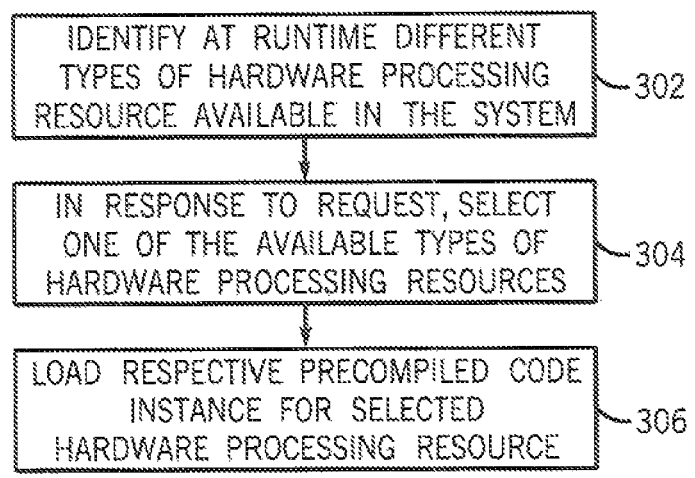
FIG. 3 is a flow diagram of a process of enhancing utilization of hardware processing resources in accordance with alternative implementations.

FIG. 3 is a flow diagram of a process according to alternative implementations for performing a particular task. During runtime, a system (such as the system of FIG. 2)

identifies (at 302) the different types of hardware processing resources available in the system. This can be based on querying the OS 218 and/or accessing the configuration file 220, as discussed above.

In response to a request to perform a particular task, such as a request submitted by a dispatcher client 214 to the dispatcher 216, the dispatcher 216 selects (at 304) one of the available types of hardware processing resources in the system. The selecting is according to the preconfigured policy 226, for example.

Next, the dispatcher 216 loads (at 306) a respective precompiled code instance for the selected hardware processing resource. If the selected hardware processing resource is one in which the respective precompiled code instance is loaded and executed on the selected hardware processing resource (e.g., general CPU 202, special CPU 204, CPU 206, and DSP 210), then the respective precompiled code instance is loaded for execution on the selected hardware processing resource, where such execution performs the requested particular task. On the other hand, if the selected hardware processing resource (e.g., encryption/decryption hardware 211 or compression/decompression hardware 212) is one in which the respective precompiled code instance does not execute on the selected hardware processing resource, then the respective precompiled code instance is loaded for execution in the system to perform specific operations, such as to perform interfacing and other operations. In the case where the selected hardware processing resource is the FPGA 208, then the loaded precompiled code instance can perform field programming of the FPGA 208 to perform the requested particular task.

Using techniques or mechanisms according to some implementations, efficient usage of available hardware processing resources in a system can be achieved. For example, certain tasks can be mapped to certain hardware processing resources for enhanced efficiency. Also, load balancing can be achieved to enhance parallel processing of tasks.

Machine-readable instructions of modules described above (including 214, 216, 218, 228 of FIG. 2) are loaded for execution on a processor (such as CPU 202 or 204, DSP 210, or GPU 206 in FIG. 2).

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   identifying, by a system at runtime, different types of hardware processing resources available in the system by querying an operating system of the system and accessing a configuration file containing information regarding at least one type of the different types of hardware processing resources available;
   receiving, from an application in the system, requests to perform corresponding tasks, wherein the application is associated with respective precompiled code instances for corresponding types of hardware processing resources of the different types of hardware processing resources;
   in response to the requests, selecting, by the system, based on a predetermined policy, corresponding ones of the different types of hardware processing resources to perform the tasks, wherein the selecting comprises selecting a first type hardware processing resource of the different types of hardware processing resources to perform the task of a first request of the requests, wherein the predetermined policy specifies load balancing of tasks across the different types of hardware processing resources and indicates which types of hardware processing resources are preferred for respective ones of the tasks; and
   to perform the task of the first request using the first type hardware processing resource, executing, in the system, a first precompiled code instance of the precompiled code instances without executing the first precompiled code instance on the first type hardware processing resource, wherein the first type hardware processing resource is a field programmable gate array, and the executed first precompiled code instance performs field programming of the field programmable gate array.

2. The method of claim 1, wherein the selecting of the corresponding ones of the different types of hardware processing resources is further based on a current state of the system.

3. The method of claim 1, wherein identifying the different types of hardware processing resources comprises identifying multiple types of hardware processing resources selected from the group consisting of:
   a central processing unit, a graphics processing unit, a digital signal processor, a field programmable gate array, encryption/decryption hardware, and compression/decompression hardware.

4. The method of claim 1, wherein
   identifying the different types of hardware processing resources comprises accessing the configuration file containing information regarding at least one type of hardware processing resource that is not visible to the operating system, the at least one type of hardware processing resource selected from among the different types of hardware processing resources.

5. The method of claim 1, wherein the selecting further comprises selecting a second type hardware processing resource of the different types of hardware processing resources to perform a task of a second request of the requests, the method further comprising:

to perform the task of the second request, execute, on the second type hardware processing resource, a second precompiled code instance of the precompiled code instances.

6. The method of claim 5, wherein the predetermined policy specifies that the first type hardware processing resource is preferred for tasks requested by the application, the predetermined policy further specifying that if the first type hardware processing resource is busy or unavailable, then the second type hardware processing resource is to be selected.

7. The method of claim 1, wherein the first type hardware processing resource is an encryption or compression hardware, and the executed first precompiled code instance performs translation between a data format of the encryption or compression hardware and a data format used in the system.

8. An article comprising at least one non-transitory machine readable storage medium storing instructions that upon execution cause a system to:
 identify, by a system at runtime, different types of hardware processing resources available in the system by querying an operating system of the system and accessing a configuration file containing information regarding at least one type of the different types of hardware processing resources available;
 receive, from an application in the system, requests to perform corresponding tasks, wherein the application is associated with respective precompiled code instances for corresponding types of hardware processing resources of the different types of hardware processing resources;
 in response to the requests, select, by the system, based on a predetermined policy, corresponding ones of the different types of hardware processing resources to perform the tasks, wherein the selecting comprises selecting a first type hardware processing resource of the different types of hardware processing resources to perform the task of a first request of the requests, wherein the predetermined policy specifies load balancing of tasks across the different types of hardware processing resources and indicates which types of hardware processing resources are preferred for respective ones of the tasks; and
 to perform the task of the first request using the first type hardware processing resource, execute, in the system, a first precompiled code instance of the precompiled code instances without executing the first precompiled code instance on the first type hardware processing resource, wherein the first type hardware processing resource is a field programmable gate array, and the executed first precompiled code instance performs field programming of the field programmable gate array.

9. The article of claim 8, wherein the selecting further comprises selecting a second type hardware processing resource of the different types of hardware processing resources to perform a task of a second request of the requests, the instructions upon execution causing the system to further:
 to perform the task of the second request, execute, on the second type hardware processing resource, a second precompiled code instance of the precompiled code instances.

10. The article of claim 8, wherein the first type hardware processing resource is an encryption or compression hardware, and the executed first precompiled code instance performs translation between a data format of the encryption or compression hardware and a data format used in the system.

11. A system comprising:
 at least one processor; and
 a dispatcher executable on the at least one processor to:
 identify different types of hardware processing resources available in the system by querying an operating system of the system and accessing a configuration file containing information regarding at least one type of the different types of hardware processing resources available;
 receive, from an application in the system, requests to perform corresponding tasks, wherein the application is associated with respective precompiled code instances for corresponding types of hardware processing resources of the different types of hardware processing resources;
 in response to the requests, select, by the system, based on a predetermined policy corresponding ones of the different types of hardware processing resources to perform the tasks, wherein the selecting comprises selecting a first type hardware processing, resource of the different types of hardware processing resources to perform the task of a first request of the requests, wherein the predetermined policy specifies load balancing of tasks across the different types of hardware processing resources and indicates which types of hardware processing resources are preferred for respective ones of the tasks; and
 to perform the task of the first request using the first type hardware processing resource, execute, in the system, a first precompiled code instance of the precompiled code instances without executing the first precompiled code instance on the first type hardware processing resource, wherein the first type hardware processing resource is a field programmable gate array, and the executed first precompiled code instance performs field programming of the field programmable gate array.

12. The system of claim 11, wherein the predetermined policy specifies a preference to execute tasks comprising the first and second tasks of the application using the second type hardware processing resource.

13. The system of claim 11, wherein the predetermined policy specifies load balancing of tasks across the different types of hardware processing resources.

14. The system of claim 11, wherein the second type hardware processing resource is an encryption or compression hardware, and the executed second precompiled code instance performs translation between a data format of the encryption or compression hardware and a data format used in the system.

* * * * *